United States Patent [19]
Carlsen et al.

[11] Patent Number: 5,720,514
[45] Date of Patent: Feb. 24, 1998

[54] CONSOLE ASSEMBLY FOR AN AUTOMOTIVE VEHICLE COMBINING ARMREST, ARTICLE RECEIVING TRAY AND AUXILIARY SEAT FEATURES

[75] Inventors: Patrick J. Carlsen, St. Clair Shores; Daniel E. Hawkins, Milford, both of Mich.

[73] Assignee: Lear Corporation, Southfield, Mich.

[21] Appl. No.: 664,202

[22] Filed: Jun. 10, 1996

[51] Int. Cl.$^6$ .................................................. A74C 7/62
[52] U.S. Cl. .................. 297/188.1; 297/234; 312/9.53; 312/9.58; 224/926; 224/487
[58] Field of Search ...................... 297/234, 188.1, 297/188.14, 188.15, 188.19; 32/9.58, 9.47, 9.48, 9.53, 9.54, 9.55, 9.56; 224/926, 487

[56] References Cited

U.S. PATENT DOCUMENTS

| | | | |
|---|---|---|---|
| 3,391,792 | 7/1968 | Makar | 312/9.58 X |
| 3,804,233 | 4/1974 | Gregg, Jr. | 224/926 X |
| 4,317,603 | 3/1982 | Pepicelli et al. | 312/9.47 |
| 4,330,161 | 5/1982 | Khawand | 312/9.58 X |
| 4,368,934 | 1/1983 | Somers | 312/9.58 X |
| 4,453,759 | 6/1984 | Kathiria | |
| 4,685,729 | 8/1987 | Heesch et al. | |
| 4,821,931 | 4/1989 | Johnson | 224/926 X |
| 4,890,883 | 1/1990 | Boerema et al. | 297/188.19 X |
| 4,913,296 | 4/1990 | Cournoyer et al. | 312/9.56 X |
| 5,007,610 | 4/1991 | Christiansen et al. | 224/926 X |
| 5,372,403 | 12/1994 | Puerto | 297/188.17 |
| 5,390,976 | 2/1995 | Doughty et al. | |
| 5,415,298 | 5/1995 | Callahan et al. | 312/9.55 X |
| 5,487,519 | 1/1996 | Grabowski | 248/311.2 |
| 5,660,310 | 8/1997 | LeGrow | 224/926 X |
| 5,662,378 | 9/1997 | Carruth | 297/188.19 X |

FOREIGN PATENT DOCUMENTS

| | | | |
|---|---|---|---|
| 799311 | 8/1958 | United Kingdom | 297/188.1 |

*Primary Examiner*—Peter M. Cuomo
*Assistant Examiner*—David E. Allred
*Attorney, Agent, or Firm*—Brooks & Kushman P.C.

[57] ABSTRACT

A console assembly for use with a pair of seats in the forward passenger compartment of an automotive vehicle including a seatback portion that may be positioned in a contiguous fashion between the seatbacks of the front seat assemblies and pivoted to a generally horizontal position to provide an armrest, and an auxiliary seat having a second lower portion normally positioned below the seatback portion when the latter assumes a generally horizontal position, the second lower portion being pivotally mounted on a housing member secured to the vehicle body structure and adjustable forward to an inverted position, the second lower portion having a cup retaining portion and a storage bin portion arranged in transverse, side-by-side relationship whereby the cup retaining portion and the storage bin are located for easy access by a vehicle driver or passenger.

2 Claims, 8 Drawing Sheets

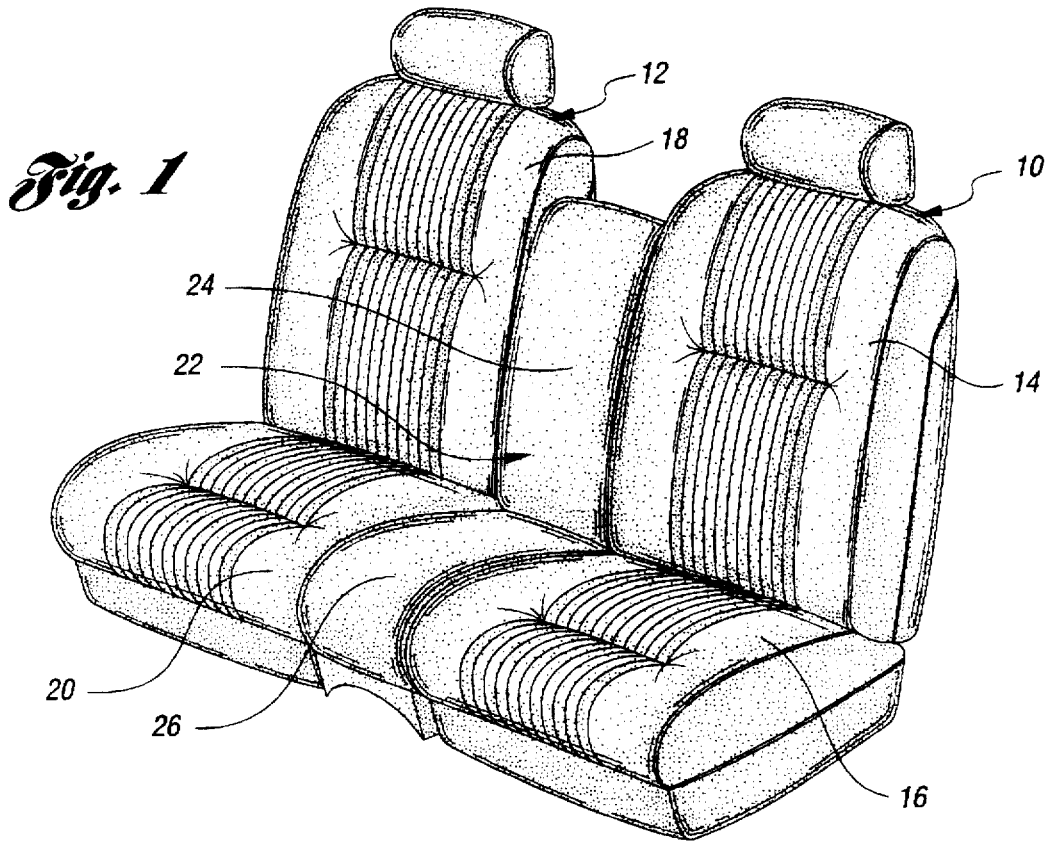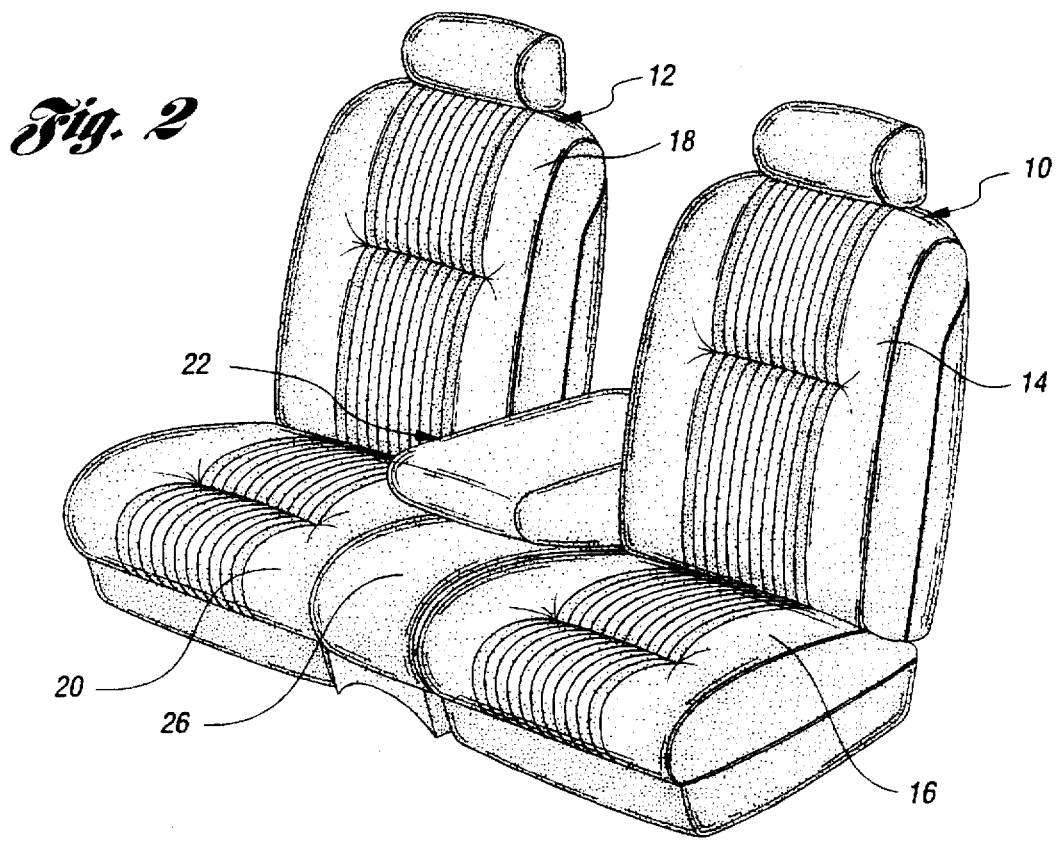

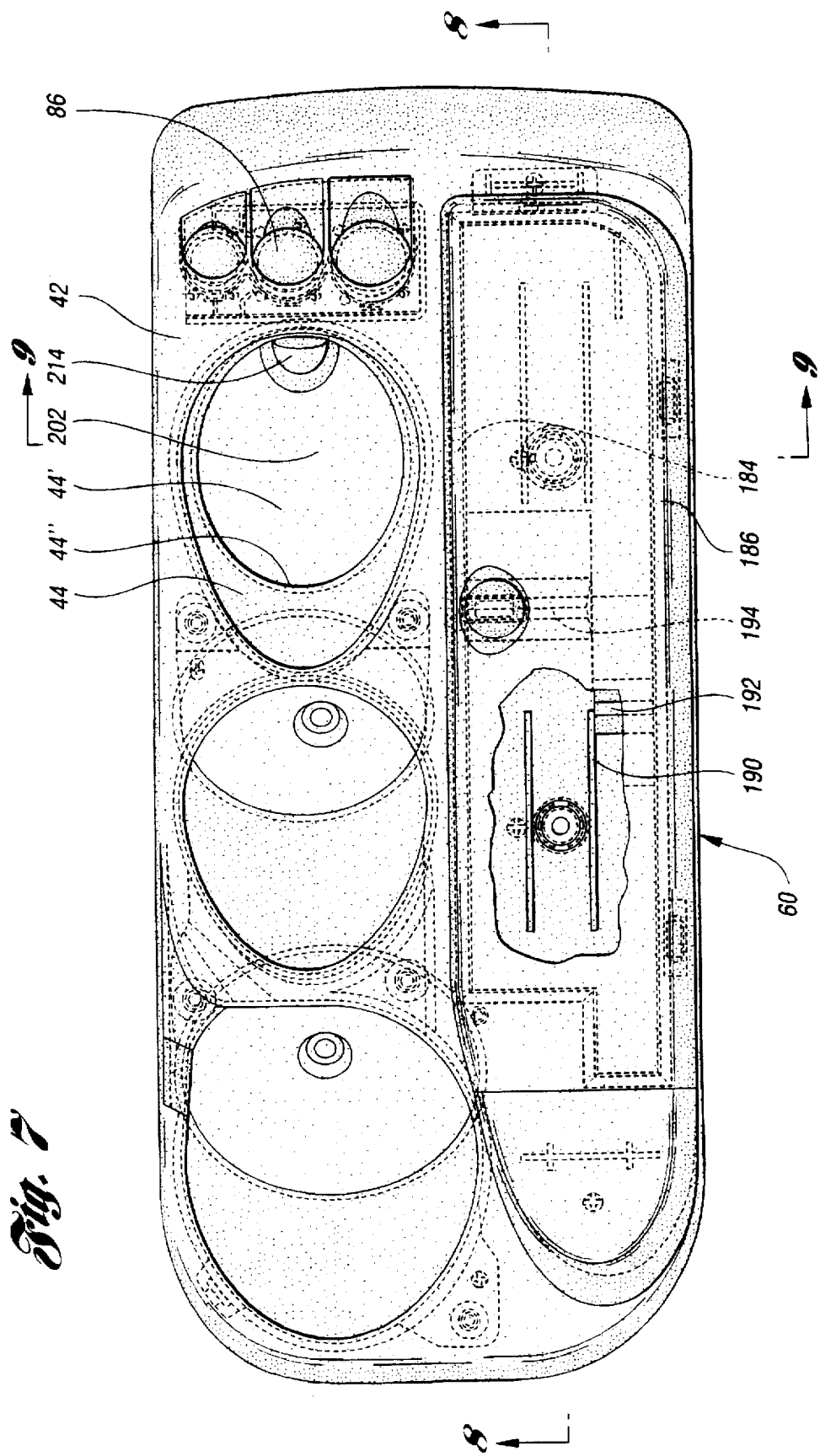

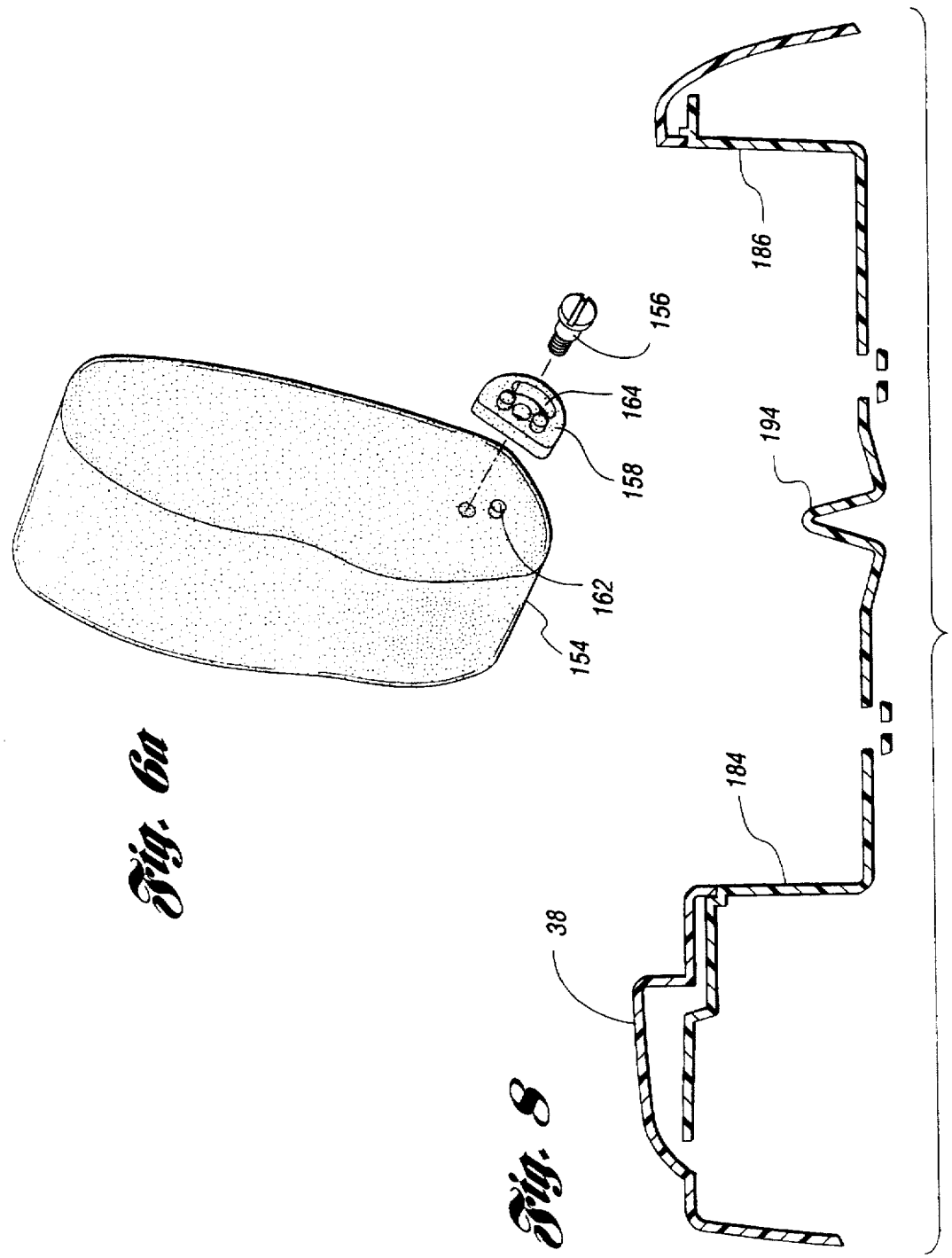

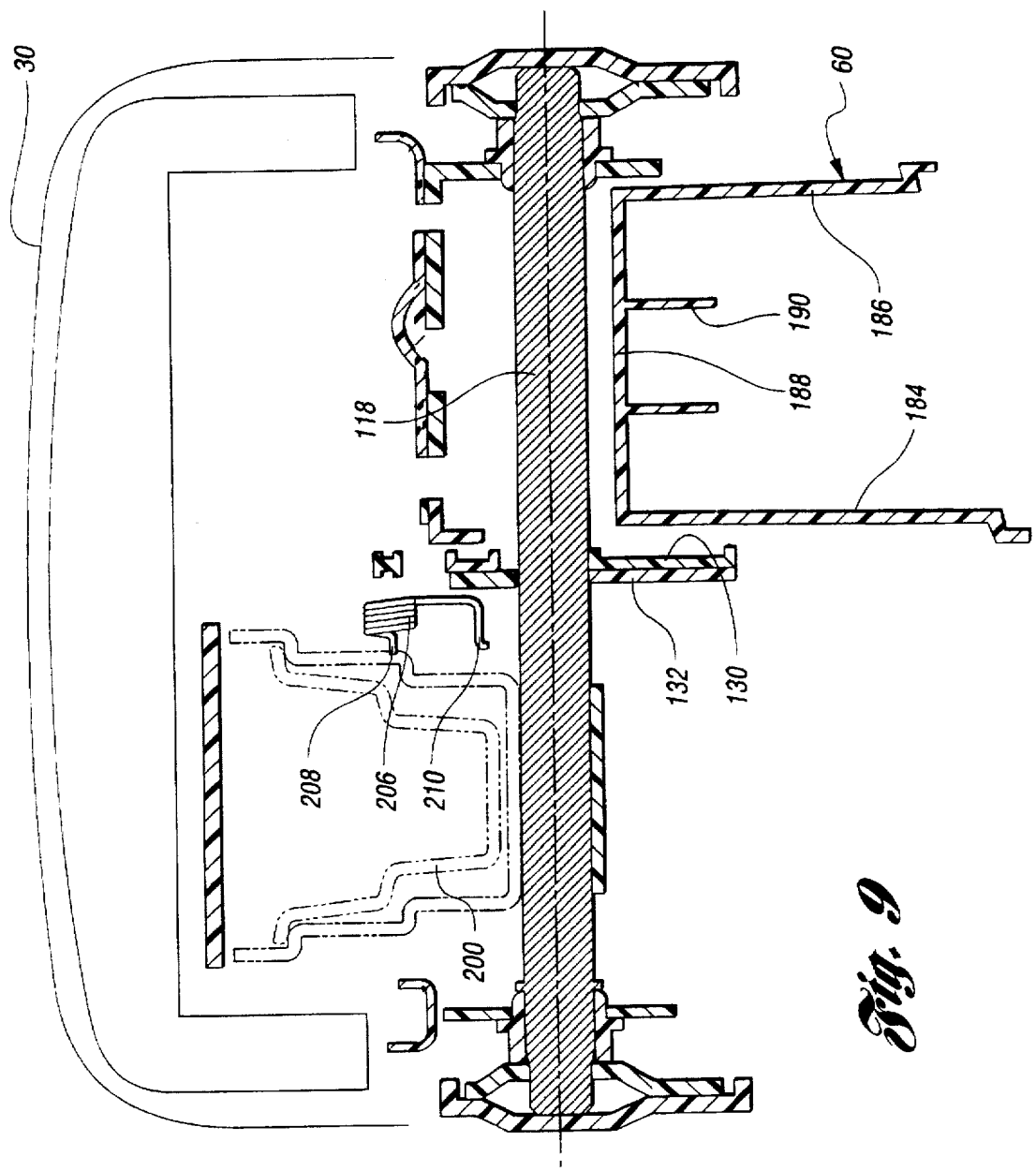

2

CONSOLE ASSEMBLY FOR AN AUTOMOTIVE VEHICLE COMBINING ARMREST, ARTICLE RECEIVING TRAY AND AUXILIARY SEAT FEATURES

TECHNICAL FIELD

This invention relates to vehicle driver and front passenger seat and console designs.

BACKGROUND OF THE INVENTION

I am aware of various console assemblies currently used in the automotive industry which provide for mounting beverage trays and storage receptacles in a vehicle passenger compartment. An example of a prior art design having this feature may be seen by referring to U.S. Pat. No. 5,390,976, which describes an armrest located between two front vehicle seats to provide an armrest and which is convertible by tilting the armrest forward to accommodate storage of various articles such as drinking cups and other small articles. Consoles may be used also, as shown in prior art U.S. Pat. No. 4,453,759, to provide an open storage bin that would be accessible to the vehicle driver and the front seat passenger. The storage bin of such prior art designs may be used to store items such as audio tape cassettes, but its storage capacity is minimal because it is located in the console assembly in a generally fore-and-aft directional plane in alignment with a tray portion that shares console space with the storage bin.

Prior art U.S. Pat. No. 4,685,729 describes still another prior art console assembly in which the upper surface of the console may serve as an armrest and wherein a seatback portion of the vehicle front seats can be pivoted in a downward direction to provide an auxiliary armrest surface or pivoted to a generally vertical position to expose an open bin for storage of small items. As in the case of the design of U.S. Pat. No. 4,453,759, the design of U.S. Pat. No. 4,685,729 includes portions that function as retainers for small items such as beverage cups which are located forward of the open storage bin along the same fore-and-aft plane. This arrangement limits accessibility to the storage bin. To overcome the lack of accessibility of the storage bin to the driver or the front seat passenger, provision is made in the design of the '729 patent for adjustment of the frame for supporting the armrest to an extended forward position. This requires the use of a complex adjusting mechanism powered by an electric motor.

BRIEF DESCRIPTION OF THE INVENTION

We have provided an improved armrest and auxiliary seat assembly for an automotive front passenger seat arrangement. An upper seatback portion of the assembly and a lower auxiliary seat portion of the assembly are pivoted on a rigid housing structure at separate pivot locations, one being forward of the other.

The lower portion can be pivoted between each of two operating positions. When it is in a first position, its upper surface is designed to provide an auxiliary seat between the vehicle driver and the front seat passenger. Its lower surface, which is exposed when it is pivoted to its second operating position, is designed to nest within the housing portion when it is pivoted to its first position. An article storage bin within the housing portion is exposed when the upper console portion is pivoted to a first, generally upright operating position.

When the lower console portion is pivoted to its first operating position, it will provide, together with the upright seatback portion, an auxiliary seat between the passenger seat and the driver's seat.

When the upright seatback portion is pivoted to its horizontal position so that it will overlie the second portion of the console assembly, it will provide an armrest for the vehicle operator or the front seat passenger.

In an arrangement of this kind, it is essential that the storage bin and beverage cup retainer portions of the console assembly, which are exposed when the lower console portion is pivoted forward to its second operating position, be constructed with a minimum transverse dimension in order to maintain proper clearances between the supporting walls of the housing structure and to avoid the need for excessive spacing in the region of the console assembly between the driver's seat and the front passenger seat. The storage bin is located directly adjacent beverage cup retainer portion. When the storage bin is used for the purpose of storing audio cassettes, the cassettes themselves may be stacked in close proximity in a transverse direction with respect to the vehicle centerline.

When the cassettes are stacked in this fashion in close proximity, it normally would be difficult for the vehicle driver to retrieve a cassette from the storage bin since there would be no finger room between the cassettes themselves to allow the selected cassette to be gripped. Provision is made in the improved design of our invention for permitting the driver or the front seat passenger to readily extract an audio cassette from the storage bin in a convenient fashion that does not cause distraction of the driver or the passenger during highway driving. The cassettes may be retrieved from the bin merely by tilting each cassette individually against an anchor point formed in the bin, which permit the cassettes individually to be tilted upward as they are selected. This promotes ease in handling of the cassettes while reducing the transverse dimension of the console assembly.

BRIEF DESCRIPTION OF THE DRAWINGS

FIG. 1 is a three-quarter perspective assembly view showing a driver seat and a front passenger seat with a console assembly disposed between them and with an upright seatback portion tilted forwardly to define an armrest;

FIG. 2 shows the assembly of FIG. 1 with the seat back portion tilted upwardly;

FIG. 4, FIG. 4a, FIG. 4b and FIG. 4c show an exploded isometric assembly view of a polyvinyl plastic portion of the console assembly of my invention including a storage bin and three beverage cup retainer pockets;

FIG. 4d is an exploded view showing the details of a coin cartridge assembly, which forms a part of the plastic console portion of FIG. 4;

FIG. 4e is a detailed view of a cassette storage bin shell;

FIG. 5a is an isometric view of a padded seat portion that forms a part of the console assembly with which the structure of FIG. 5 is assembled;

FIG. 5b is an isometric view of a pivot shaft that rotatably supports the structure of FIGS. 5 and 5a;

FIG. 6a is an isometric view of the upright seatback portion that can be pivoted from the position shown to a horizontal position;

FIG. 7 is a planar view of the polyvinyl structure illustrated in FIG. 4;

FIG. 8 is a cross-sectional view taken along the plane of section line 8—8 of FIG. 7; and FIG. 9 is a cross-sectional view taken along the plane of section line 9—9 of FIG. 7.

PARTICULAR DESCRIPTION OF THE INVENTION

Figure 3:
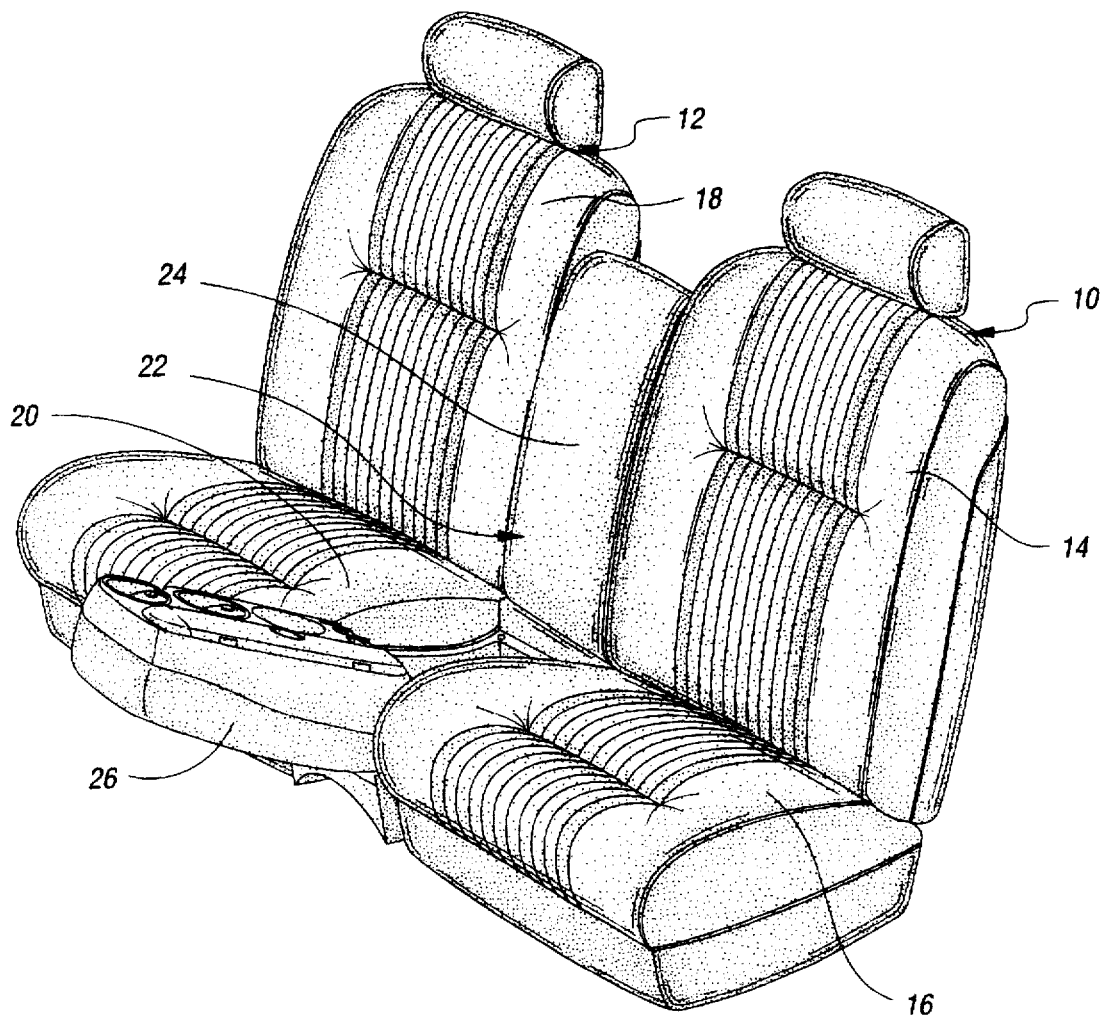
FIG. 3 shows a portion of the console assembly of FIGS. 1 and 2 with the lower portion of the assembly tilted forwardly about its axis thereby making the beverage cup retainer and cassette storage bin accessible to the driver and the front seat passenger.

FIG. 1 shows a front seat assembly for an automotive passenger vehicle. It includes a driver's seat 10, a passenger seat 12. The driver's seat 10 includes an upright seatback portion 14 and a horizontal seat portion 16. Similarly, the passenger 12 includes an upright seat portion 18 and a horizontal seat portion 20.

Located between the seat 10 and the seat 12 is a console assembly generally identified by reference numeral 22. It includes an upper portion 24 and a lower portion 26. The upper portion can be pivoted at its base to the upright position shown in FIG. 1, thereby providing a seatback for an auxiliary seat assembly while the lower portion 26 provides a horizontal seat portion of the auxiliary seat assembly.

FIG. 2 shows the lower console portion folded down to its auxiliary seat position and the upper portion folded down to an armrest position. When the upper portion 24 is in the position shown in FIG. 2, it provides an armrest for the driver or the front seat passenger.

FIG. 3 shows the lower console portion 26 pivoted outwardly so that the under surface of the portion 26, when it is positioned as shown in FIG. 2, becomes the upper surface when it is pivoted outwardly thereby making accessible to the driver and the front seat passenger beverage cup retainer recesses and a storage bin which is adapted particularly to store audio cassettes. This will be described with reference to FIGS. 4 through 4e.

Figure 5:
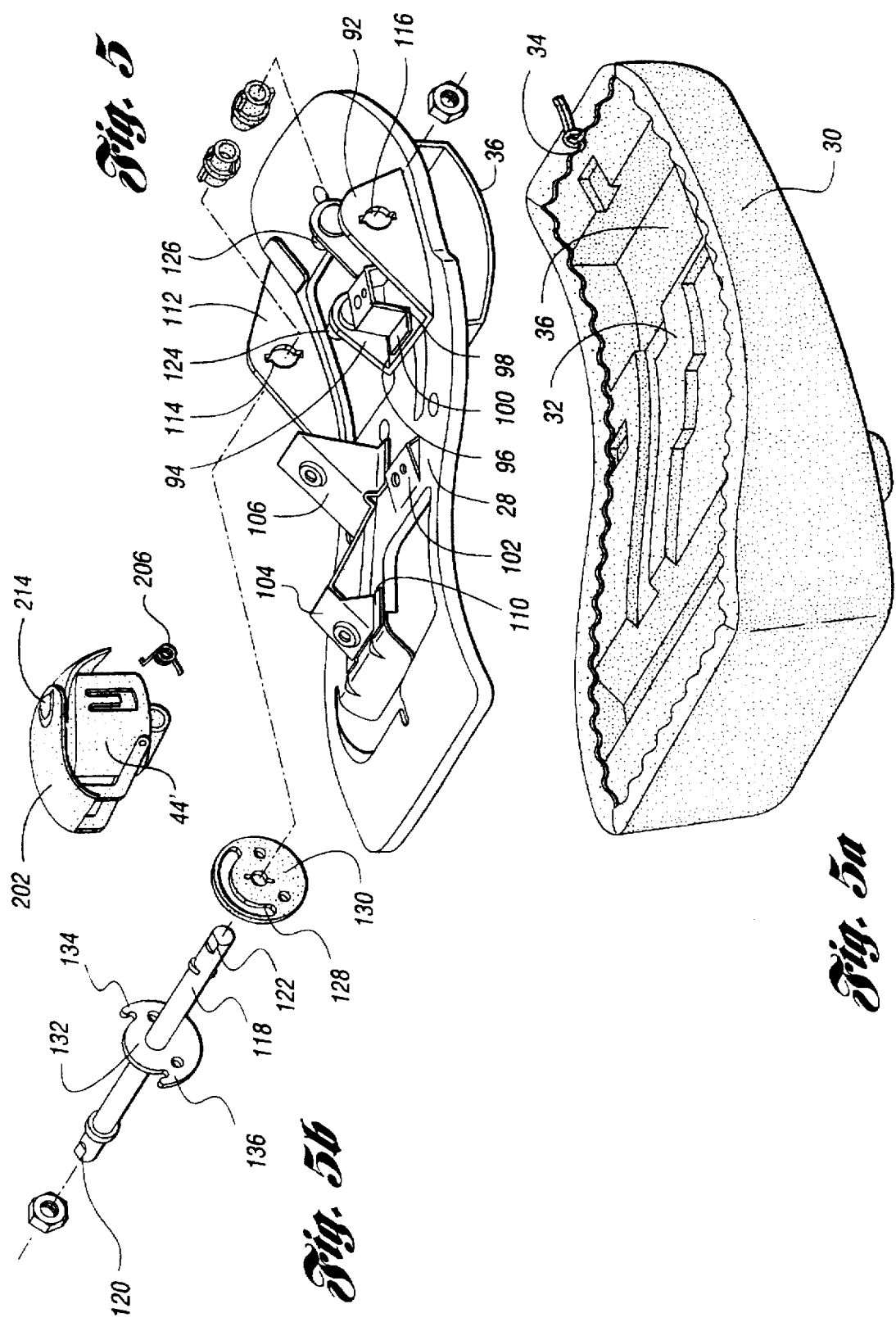
FIG. 5 is an isometric view of a metallic support for the polyvinyl storage bin and beverage cup retainer portion of FIG. 4.

The lower console portion comprises a structural steel platform or base 28. By preference, it is generally S-shaped in the fore-and-aft direction. FIG. 5 shows the structural base 28 as it would appear when the lower portion is pivoted to its outward position as shown in FIG. 3.

A seat cushion part of the lower portion 28 is shown in FIG. 5a at 30. It comprises an inner rigid structural reinforcing skeleton 32 about which a cushion envelope is attached. By preference, the margin of the cushion can be secured to the skeleton 32 by nylon cords 34 or any similar retainer device. The inner structural core or skeleton includes a cavity 36, which is adapted to receive a bracket portion 36 which may be spot welded to the underside of the support 28 as shown in FIG. 5. This provides a clearance for an ashtray and for bracket structure that will be used with the pivot rod for the support 28, as will be described with reference to FIGS. 5b and 6. The ashtray construction, however, is not a part of the present invention and will not be particularly disclosed.

Figure 4:
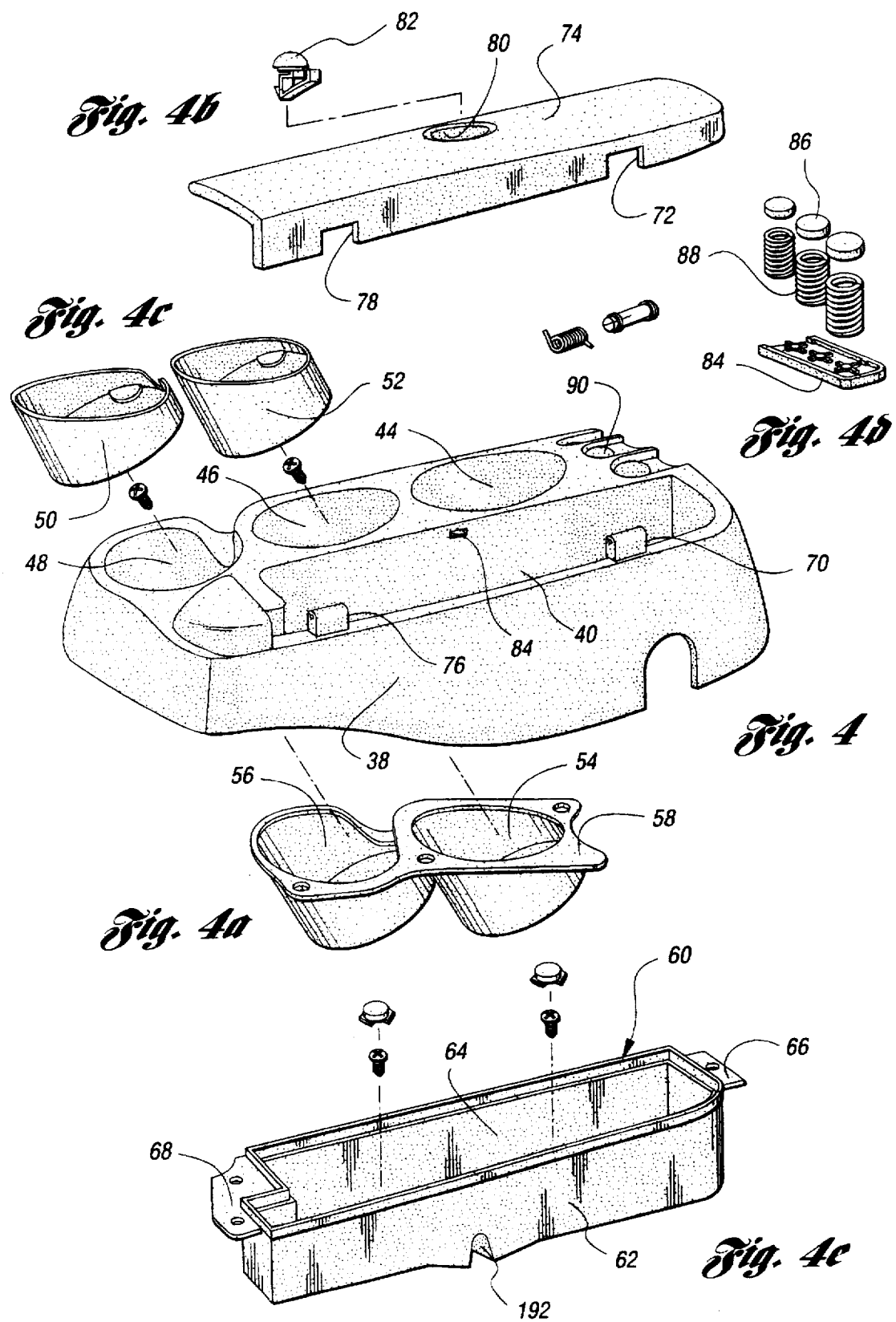

The polyvinyl plastic section shown in FIG. 4 comprises a shell defining a peripheral wall 38. The shell is a one piece integral molding with an elongated opening 40 and an upper planar section 42 in which recesses 44, 46 and 48 are formed during the molding process. A liner 50 of generally cylindrical shape is inserted into the opening 48 and a corresponding liner 52 is received in opening 46. By preference, the opening 44 is formed with an internal wall and an internal base during the molding operation as part of the horizontal planar section 42.

FIG. 4a shows a separate molding that defines a part of the openings 46 and 48. It comprises a generally cylindrical portion 54 and a corresponding cylindrical portion 56. These are adapted respectively to register with the liners 52 and 50. The molding, as shown in FIG. 4a, includes a flange 58 that may be pressure and heat welded to the underside of the planar section shown at 42.

FIG. 4e shows an insert that defines a storage bin generally shown at 60. It is of generally rectangular shape and it includes sidewalls 62 and 64. Insert 60 is provided with a flange 66 at one end and a flange 68 at the other end. These permit the insert 60 to be pressure heat welded to the underside of the unitary molding 38 thereby defining the opening 40 described with reference to FIG. 4.

One margin of the opening 40 in the unitary molding or shell shown in prior art 38 has a hinge projection 70 that is adapted to be received in hinge recess 72 formed in bin cover 74, as seen in FIG. 4b. A corresponding hinge projection 76 is adapted to be received in hinge opening 78 in the cover 74, as seen in FIG. 4b. Hinge pins are used to hinge the cover 74 on the projections 70 and 76 at the spaced hinge locations.

One margin of the cover is provided with an opening 80 to receive a latch 82, which is adapted to register with latch opening 84 in one wall of the storage bin as seen in FIG. 4 when the cover 74 is pivoted on its hinges to the closed position shown in FIG. 4b.

FIG. 4d shows a conventional coin holder which comprises a base 84 that may be pressure heat welded to the underside of the planar section 42 of the molding, as shown in FIG. 4. Pushbuttons 86 are urged by springs 88, thereby forcing coins to their uppermost positions in the openings 90 formed in the planar section 42 of the molding. The springs 88 are anchored on the base 84.

The structural frame 28, shown in FIG. 5, carries a support bracket having two vertical flanges 92 and 94. The base 96 of the bracket is welded to the upper surface of the support 28, as seen in FIG. 5. A secondary hat-shaped bracket 98 has flanges, as shown in 100, which are welded to the base 96 of the primary bracket. The bracket 98 is generally aligned in a fore-and-aft direction with a bracket 102 which is formed by displacing a portion of the support base 28. The hat-shaped bracket 98 and the bracket 102 have retainer screw openings that can accommodate a threaded fastener or some other suitable fastener for retaining the plastic shell 38 of FIG. 4 and the cushioned structure 32, as shown in FIG. 5a, in assembled relationship, one with respect to the other.

The steel support structure 28 is provided also with support brackets 104 and 106, which can be welded at flanges 108 and 110, respectively, to provide support for the beverage cup receptacle molding shown in FIG. 4a. Each bracket 104 and 106 is provided with an opening to accommodate a threaded fastener or some other suitable fastener for retaining the molding shown in FIG. 4a securely in place as part of the assembly that is supported by the base 28.

A flange 112, formed on one margin of the base 28, is provided with a shaft opening 114. A corresponding opening 116 is formed in the flange 92. A pivot shaft for the lower console portion is shown in FIG. 5b at 118. It extends through the openings 114 and 116 and may be locked in place at the ends 120 and 122 by a suitable fastening device such as a locknut. End 122 is locked in the opening 116 and end 120 is locked in the opening 114.

Bracket flange 94, as seen in FIG. 5, carries a pin which extends horizontally as indicated at 124. The second pin 126 also extends from the bracket flange 94 in a direction parallel to the pin 124. It is located in the same fore-and-aft plane as the pin 124.

Pin 124 is adapted to be received in opening 128 of a plastic guide plate 130, as seen in FIG. 5b. The opening 128 is arcuate with its center on the center of the shaft 118. Located directly adjacent the guide plate 130 is a steel plate 132 which acts as a stop for limiting the angular movement of the lower console portion about the axis of shaft 118. The steel plate includes two stop portions, seen at 134 and 136, which are arranged with respect to the shaft 118 so that they will engage pin 126 when the lower console portion is tilted to its limiting forward position and to its limiting position in the opposite direction. Both the steel plate 132 and the guide plate 130 are non-rotatably secured to the shaft.

Figure 6:
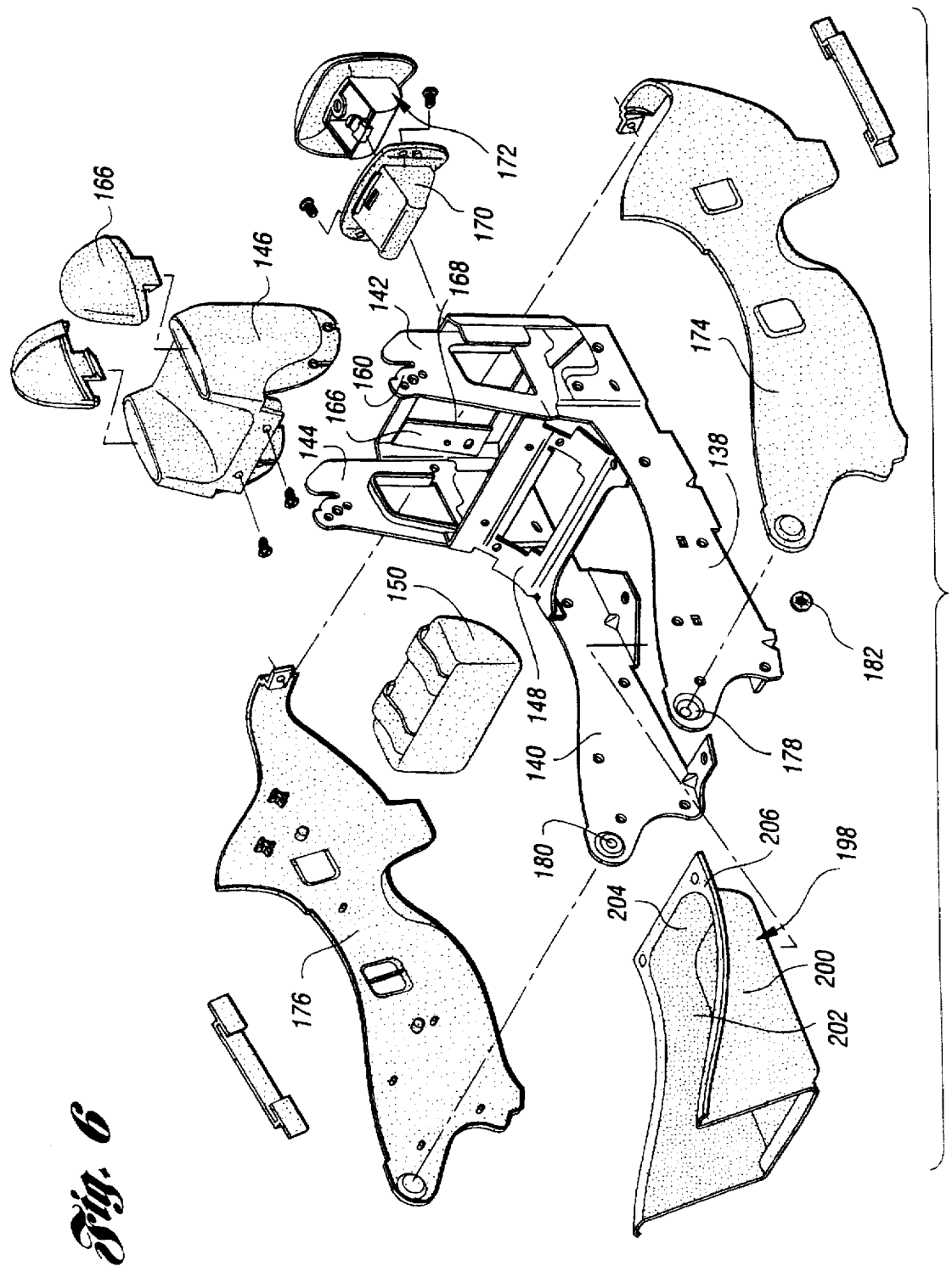
FIG. 6 is an exploded isometric assembly view of the structural portions of the console assembly including the housing on which the support structure of FIG. 5 is mounted.

The structural housing shown in FIG. 6 includes a first side wall 138 and a second side wall 140. The sidewalls 138 and 140 generally conform to the shape of the structural plate 128 of FIG. 5. The right hand ends of the sidewalls 138 and 140 project generally upwardly, as seen at 142 and 144. These upward projections are covered by a plastic covering 146.

The sidewalls 138 and 140 are joined at an intermediate location by structural bracket 148, preferably by spotwelding. The upper surface of the bracket 148 provides a base for supporting a cushion 150, which is located between the end 152 of the cushion 30, shown in FIG. 5a, and the base 154 of the upright seatback portion, as shown in FIG. 6a.

The seatback portion, shown in FIG. 6a, is mounted pivotally on the upright portions 142 and 144 of the structural housing. Pivot pins 156 provide a pivot point for the upright seatback portion. It is received through an opening formed in mounting brackets, one of which is shown at 158 in FIG. 6a. The opening for the pin 156 in bracket 158 is aligned with opening 160 for the upright portion 142. A corresponding opening is formed in upright portion 144. A guide pin 162 is received in arcuate opening 164 of the bracket 158 to provide a stop for limiting the angular movement of the upright seat portion about the axis of the pins 156.

The top of the cover 146 has caps shown at 166, which cover the upper end of each upright portion 142 and 144.

The rearward end of the structural housing, as shown in FIG. 6, comprises a structural end plate 166 with an opening 168 for receiving a molded plastic ashtray insert 170. A steel ashtray and plastic cover assembly 172 register with the molding 170. The ashtray assembly 172 is accessible to the rear seat passengers in the vehicle.

The structural walls 138 and 140 are covered by a plastic covering 174 and 176, respectively.

The end 122 of the stationary shaft 118 is received in opening 178 formed in the side plate 138, and end 120 of the stationary shaft 118 is received in opening 180 in the side plate 140. A locknut 182 secures the shaft end 122 to the side plate 138.

FIG. 9 shows a transverse cross-sectional view across the lower console portion. It shows the cassette storage bin 60 in its inverted position, which is the position it assumes when the structural plate 28 with the cushion 30 is pivoted clockwise from the position shown in FIG. 5. The lateral sides of the bin 60 include sidewalls 184 and 186. The base of the storage bin, which is identified in FIG. 9 by reference numeral 188, has vertical spacers 190 which serve to position the cassettes when they are assembled in the bin so that they rest in generally vertical planes.

The base of the bin 60 is molded with an integral ridge 192, which is seen also in the isometric view of FIG. 4e. A corresponding ridge 194 is molded in the base of the bin adjacent the bin side 184.

When the cassettes are assembled in the bin in generally vertical planes in the spaces defined by the separator spacers 190, the rearmost edge of each cassette is anchored against the ridge 192 or 194. This permits the occupant of the driver's seat or the passenger seat to tilt the selected cassette about the anchor point defined by the ridges 192 or 194. This makes the cassettes much more accessible without the need for providing space in a lateral direction between the cassettes themselves. The accessibility of the cassettes for ready removal is accommodated in this fashion. The lateral dimension of the bin and the lateral dimension of the console assembly itself can be reduced. This economy of space makes it feasible for body engineers and designers to provide for the optimum dimensioning of the passenger seat and the driver seat within the restricted confines of the vehicle passenger compartment.

Shown in FIG. 6 is a molded plastic bin 198 having lateral sides 200 and 202 and a rear wall 204. The bin is open at its top. It is intended to cover the base of the structural housing shown in FIG. 6 when it is positioned between the sidewalls 138 and 140.

The bin 198 is accessible when the lower console portion is pivoted about the shaft 118 in a forward direction. It includes a flange 206 that may be secured to the transverse structural member 148 by suitable fastening techniques.

What is claimed is:

1. A front seat console assembly for an automotive vehicle having independent driver and front passenger seats in a vehicle passenger compartment defined by a vehicle body, said passenger compartment having a structural deck;

a console housing structure adapted to be secured to said deck between said seats;

a lower console portion having a first upper surface and a second lower surface mounted pivotably on said housing structure on an axis extending transversely with respect to a center fore-and-aft plane of said vehicle, said lower console portion being adjustable to a generally horizontal position whereby its upper surface defines a seat portion of an auxiliary seat, said auxiliary seat being pivotably adjustable forwardly until said upper and lower surfaces are inverted, at least one cup retainer recess and a cassette storage bin formed in said second surface of said lower console portion for storing tape cassettes;

an upper console portion pivotally mounted in said housing structure on an axis spaced in a fore-and-aft rearward direction from and parallel to said first axis;

said upper console portion forming a generally horizontal armrest when it is pivotably adjusted forwardly about said second axis and forming a seat back portion of said auxiliary seat when it is adjusted to a generally upright position;

a secondary storage bin located in said housing structure below said lower console portion when the latter is adjusted to its generally horizontal position;

said cassette storage bin and said cup retainer recess being located in transversely spaced relationship at approximately the same distance from said first axis in said fore-and-aft direction;

said housing structure having two generally vertical wall portions spaced transversely one with respect to the other, said secondary storage bin being disposed between said wall portions;

said cassette storage bin including a one piece base comprising two coplanar portions fore and aft of an anchor element, said anchor element comprising a first recessed portion forwardly adjacent a transverse ridge and a second recessed portion rearwardly adjacent said transverse ridge, said first recessed portion rearwardly adjacent a first of said two coplanar portions and a second recessed portion forwardly adjacent a second of said two coplanar portions, said recessed downwardly of said coplanar portions and said transverse ridge protruding upwardly of said coplanar portions, said anchor element being engageable with lower corners of tape cassettes when the latter are stored in said cassette storage bin whereby each cassette may be manually selected and tilted about said lower corner to permit said cassettes to be readily extracted as a force is applied to the upper corner of said tape cassettes in a fore or aft direction toward said anchor element.

2. The console assembly as set forth in claim 1 wherein said cassette storage bin includes vertical cassette retaining spacers spaced laterally therein and extending upward from said base of said cassette storage bin whereby stored cassettes are held in a generally vertical position with minimal lateral spacing therebetween.

* * * * *

UNITED STATES PATENT AND TRADEMARK OFFICE
CERTIFICATE OF CORRECTION

PATENT NO. : 5,720,514
DATED      : Feb. 24, 1998
INVENTOR(S) : Patrick J. Carlsen et al.

It is certified that error appears in the above-indentified patent and that said Letters Patent is hereby corrected as shown below:

Column 7, Line 17, Claim 1,    After "recessed" insert --portions being recessed--.

Signed and Sealed this

Eighth Day of September, 1998

Attest:

BRUCE LEHMAN

Attesting Officer    Commissioner of Patents and Trademarks